United States Patent [19]

Hodel et al.

[11] 4,194,018
[45] Mar. 18, 1980

[54] METHOD OF PRODUCING AN AQUEOUS SOYA SUSPENSION

[75] Inventors: Théodore Hodel, Yverdon; Marcel Buhler, Tolochenaz; Josef Rehacek, Yverdon, all of Switzerland

[73] Assignee: Societe d'Assistance Technique pour Produits Nestle S.A., Lausanne, Switzerland

[21] Appl. No.: 838,130

[22] Filed: Sep. 30, 1977

[30] Foreign Application Priority Data

Oct. 8, 1976 [CH] Switzerland .................... 12793/76

[51] Int. Cl.² ........................... A23L 1/20; A23L 2/00
[52] U.S. Cl. ................................ 426/580; 426/582; 426/598; 426/634; 426/520
[58] Field of Search .............. 426/580, 634, 520, 46, 426/598, 582

[56] References Cited

U.S. PATENT DOCUMENTS

| | | | |
|---|---|---|---|
| 3,798,339 | 3/1974 | Peng | 426/634 |
| 3,901,978 | 8/1975 | Nelson et al. | 426/598 |
| 3,937,843 | 2/1976 | Osaka et al. | 426/46 |
| 3,947,598 | 3/1976 | Stenne | 426/46 |
| 3,966,992 | 6/1976 | Banks et al. | 426/634 |
| 4,041,187 | 8/1977 | Nelson et al. | 426/634 |

*Primary Examiner*—David M. Naff
*Attorney, Agent, or Firm*—Watson, Leavenworth, Kelton & Taggart

[57] ABSTRACT

An aqueous soya suspension is prepared by grinding soya beans in the presence of water at a temperature of from 90° to 100° C. to form a dispersion of particles of which the majority have dimensions of the order of 100 to 500μ; heating the dispersion by the injection of steam to a temperature of from 120° to 160° C. thereby destroying the antitrypsin factor; and grinding the dispersion to form a suspension containing corpuscules of protein and fat with dimensions of the order of 2 to 10μ and cell wall debris of which the largest dimension does not exceed substantially 40 to 300μ. The soya suspension may be consumed as such or used as a starting material for the production of foods such as cheese or used as a base for the production of beverages such as a cows' milk substitute.

12 Claims, No Drawings

METHOD OF PRODUCING AN AQUEOUS SOYA SUSPENSION

This invention relates to a process for the production of an aqueous soya suspension in which soya beans are ground in the presence of water and the antitrypsin factor therein is destroyed by the effect of heat.

There are innumerable methods of processing soya into liquid or powder-form products intended for human consumption in the form of actual soya products, such as milks or cheeses essentially based on soya, or in the form of a protein element or complement entering into the composition of dietetic foods for example. Considerable efforts have been made in particular to eliminate from these products the bitter taste characteristic of soya and to give them a consistency or a taste to the palate comparable with that of similar milk-based products. Efforts have also been devoted to improving the techniques of eliminating the flatulent sugars, oligo-saccharides responsible for flatulence phenomena, and inactivating the antitrypsin factor which are used in the manufacture of these soya products.

Accordingly, it is now known that the bitterness of soya products is due to the action of a lipoxidase which is released during the grinding of cotyledons, but that this lipoxidase only causes the degradation of fats when it comes into contact with them in the presence of water. Similarly, the preponderant role which the size of the soya particles plays in the sensation which a soya product leaves on the tongue is now known. Furthermore, both the nature and the mode of action of the flatulent sugars and the antitrypsin factor are now known.

In a recent known process for the production of a base for beverages derived from soya beans, whole soya beans are softened or the lipoxydase is inactivated by heating, the beans are then broken up to remove the hull which is carried away by a stream of water, the fragmented beans are ground in the presence of water and the aqueous dispersion of ground beans is homogenised under pressure to form an aqueous suspension containing all the constituents of the bean. Softening is carried out either by soaking followed by heating or by a combination of soaking and heating. Inactivation of the antitrypsin factor is supposed to be carried out at the same time as inactivation of the lipoxidase, the recommended temperatures being of the order of the boiling temperature of water and the recommended treatment times being of the order of 20 to 40 minutes. Particular attention is given to the degree of softening obtained. This process raises various questions. In particular, the question may be asked whether softening of the seeds by soaking the beans in cold water, during which the beans absorb water, is not at variance with the required objective which is to avoid the action of the lipoxidase on the fats of the bean. The question may also be asked whether a heat treatment which is sufficient for inactivating the lipoxidase is also sufficient for inactivating the trypsin inhibitor and hence whether, by applying only a moderate heat treatment which has the advantage of denaturing the proteins to a lesser extent, the digestibility of the product obtained is not in danger of being reduced.

In one known process for producing a soya milk concentrate, the unhulled beans are soaked in cold water, after which they are passed through hot water and then through cold water to eliminate their bitterness, water is added to them, the mixture is ground to form an aqueous dispersion of ground beans which is then heated to more than 120° C. for a good 10 minutes, the dispersion is cooled in vacuo for deodorisation, the insoluble fractions are separated therefrom, the composition of the soluble fraction is standardised by the addition of sugar for example, and a milk is obtained which is sterilised by heating above 100° C. and then concentrated by evaporation. It will be noted that this known process also comprises the dangerous step of soaking in cold water. It can be seen that it is logically followed by a step where the bitterness is removed which, however, begs the question to what point it is effective. It will also be noted that there are two prolonged heat treatments carried out at temperatures above the boiling point of water. Finally, it will be noted that the end product is improved by the addition of sugar. There is nothing surprising in this step when it is taken into consideration that soya products are often given a standardised composition according to nutritional or legislative criteria. On the other hand, however, it is not possible to escape the notion that known soya products can only be described as pleasant-tasting and free from the bitter note characteristic of soya because this note, which is not liked among western consumers, is more or less well concealed by additives, this remark also being valid for the first known process mentioned above.

In a certain number of known processes, provision is made for at least one step during which a dispersion of soya particles, of the type obtained by grinding beans in the presence of water for example, is subjected to a violent physical treatment in such a way that the particles are divided into several corpuscles of smaller dimensions. In the majority of cases, this treatment comprises homogenisation under a high pressure, of the order of several hundred atmospheres, in a conventional homogeniser, for example of the type manufactured by the Manton-Gaulin company. In one of these known processes, the particles are thus reduced into corpuscles with dimensions of from 4 to 40μ, as seen under an electron scan microscope. In another of these known processes, the particles are reduced into corpuscles having dimensions of from 2 to 10μ. The large corpuscles having dimensions of from 8 to 10μ are even subsequently separated by centrifuging. Although it is undeniable that particles with overlarge dimensions are in danger of sedimenting rapidly, it would seem that the dimensions of the corpuscles cannot be reduced indefinitely without running the risk of imparting an excessive viscosity to the suspension, quite apart from the fact that these corpuscles appear to be of different types which it may be advisable to distinguish from one another.

The present invention is the outcome of a search for a reliable process for producing an aqueous soya suspension in which the bitter note is truly eliminated, the denaturing of the proteins is not excessive, the degree of sedimentation is substantially zero and the taste and consistency are pleasing to the palate without the help of additives.

The invention provides a process for the production of an aqueous soya suspension, which comprises grinding soya beans in the presence of water at a temperature of from 90° to 100° C. to form a dispersion of particles of which the majority have dimensions of the order of 100 to 500μ; heating the dispersion by the injection of steam to a temperature of from 120° to 160° C. thereby destroying the antitrypsin factor; and grinding the dispersion to form a suspension containing corpuscles of protein and fat with dimensions of the order of 2 to 10μ and cell wall debris of which the largest dimension does not exceed substantially 40 to 300μ.

Preferably, the dispersion is grinded in a bead mill and the largest dimension of the cell wall debris does not exceed substantially 40 to 100μ.

The beans may be hulled by crushing the whole beans in dry form and by removing the skins by blowing before they are ground in the presence of water. After they have been crushed and hulled, the beans may be blanched for 5 to 15 minutes in water having a temperature of from 90° to 100° C. in proportions of 6 to 10 parts by weight of water to 1 part by weight of beans before being ground in the presence of water.

The dimensions of the particles were determined by examination under a microscope. In the case of the cell wall debris, reference is only made to the largest dimension or the maximum dimension or dimensions in view of the fact that, under a microscope, these debris appear in the form of plates having a thickness of from about 1 to 2.5μ and dimensions of the order of 10 to 100 times larger.

The product obtained by the process according to the invention is characterised by surprising qualities of unctuousness, softness and stability. It may be consumed as such or used as a starting material for the production of cheeses, flans or dessert creams or as a base for the production of beverages for example. It may also be dried as such or after the addition of suitable ingredients to make it into a powder which may also be used for the production of cheeses, custards, dessert creams or beverages for example.

For carrying out the process according to the invention, it is possible to start with any variety of soya beans. Whole beans or hulled beans may be used. In the latter case, the beans are preferably hulled in dry form because it is desired to avoid soaking in cold water which may promote the action of the lipoxidase on the unsaturated oils of the beans. To this end, the beans may be crushed in a hammer mill or toothed disc mill. The hulls which are removed during crushing may be eliminated by means of a blower. In the context of the invention, the expression "hulling the beans in dry form" means that the beans, which have a moisture content of less than about 12% by weight, are hulled without the addition of water. In cases where this percentage moisture content is higher, it is advisable to subject the beans to preliminary drying.

To obtain the dispersion of particles of which the majority have dimensions of the order of 100 to 500μ, the beans are then ground in the presence of water at a temperature in the range of from 90° to 100° C. Before this grinding step, however, it is possible, although not absolutely necessary, to soak the beans for a few hours in water heated to above 90° C. or to pass them continuously into a heated chamber where they come into contact with a stream of water at a temperature of from 90° to 100° C. This blanching treatment may be carried out continuously in an inclined, jacketed Archimedean screw for example. The screw may be fed with beans from below and with water from above under such conditions that the residence time of the beans in the screw is of the order of 5 to 15 minutes and that the input of water corresponds to between 6 and 10 times the input by weight of beans. The grinding operation in the presence of water may be carried out in any type of adequate apparatus known to the expert, such as a hammer mill or a cone mill followed by a stone mill, in one or several steps for example. For this grinding operation, the beans may be mixed with water in a ratio by weight of from 1:2 to 1:8.

The step in which the dispersion is heated by the injection of steam to a temperature of from 120° to 160° C. may be carried out in an apparatus provided with a suitable injection nozzle, such as those used in the dairy industry, for example, for sterilising the milk at a high temperature in a short time. It has been found that a treatment such as this enables the antitrypsin factor to be effectively inactivated. Accordingly, it is preferable to any other heat treatment intended for the same purpose by virtue of its rapidity and the minimal denaturation of the proteins resulting therefrom. In effect, the duration of the treatment may be from 5 to 30 seconds. It corresponds to the resistance time in the apparatus from the moment when the dispersion enters under pressure the nozzle where the steam is injected to the moment when the dispersion passes through a decompression valve after having passed through a mixing zone.

At the output end of the steam injection apparatus, it can be advantageous to cool the dispersion to a temperature of from 75° to 85° C. by flashing during which any volatile components responsible for still noticeable odours may be eliminated.

The following step of preferably grinding in a bead mill is particularly important because of the direct bearing it has upon the unctuousness and stability of the suspension obtained. In effect, it has been found that not only is the treatment of an aqueous soya dispersion in an apparatus of this type possible, but it can also give quite extraordinary results in regard to the organoleptic qualities of the product obtained. These qualities are largely dependent upon the degree of disintegration of the soya particles, i.e. upon the dimensions of the corpuscles of the suspension obtained, which may be determined by a suitable choice of the size of the beads and of the duration and intensity of the treatment. Examination under a microscope has shown that it is necessary to distinguish between, on the one hand, the corpuscles of protein and fat released from the cells during the disintegration process and, on the other hand, the debris of the cell walls if the suspension obtained is to be described with realism. It is for this reason that, in the process according to the invention, the step of grinding the dispersion is carried out in such a way that the suspension obtained contains corpuscles of protein and fat ranging from 2 to 10μ, in size and cell wall debris of the size described above. It has been found that more intensive grinding could result in an excessive increase in viscosity and even in an exaggerated increase in pH accompanied by an undesirable change in the taste and colour of the suspension. On the other hand, less intensive grinding scarcely enables the agreeable results expected to be obtained. In this respect, if the suspension is intended to be consumed as such or merely with flavouring, it is advantageous to fix the quantities of water used and the intensity of grinding in the bead mill in such a way that the suspension obtained has a viscosity of from 10 to 100 cP at 20° C. for a dry matter content of from 6 to 13% by weight. It is also advisable to watch for the pH of the suspension obtained to remain between 6.6 and 7.

It is also possible to add the usual food-grade additives or complements to the soya dispersion before grinding in the bead mill in order to provide the product with particular nutritive, organoleptic, physical or keeping properties. In particular, if the soya dispersion is intended ultimately to enter into the composition of a processed food, such as a cream or a custard, the other ingredients entering into the composition, such as sugar or cocoa for example, may be ground in the bead mill at the same time as the dispersion.

The process according to the invention has the further advantage that it may be carried out continuously. In cases where this procedure is adopted, it is advisable to utilise the technique of ultrafiltration or diafiltration to eliminate the flatulent sugars which greatly reduce the digestibility of the product obtained. Otherwise, other known techniques, such as fermentation (e.g. lactic fermentation) by certain yeasts or an enzymatic treatment, for example, may be used for eliminating or degrading these sugars. The flatulent sugars may be eliminated or degraded before or after grinding in the bead mill.

The present invention also relates to the products obtained by the process just described and to some of their uses, particularly in combination with an ultrafiltration permeate of cows' milk or whey for the production of a cows' milk substitute.

The following Examples are given by way of illustration. The percentages quoted therein represent percent by weight.

EXAMPLE 1

50 kg of whole soya beans originating from Canada are swollen in 300 liters of demineralised water to which 250 g of sodium bicarbonate have been added. The beans are washed with tap water for 10 mintes. 2.5 kg/minute of soaked and washed beans and 6 kg/minute of water are then introduced into an open-mouth pump by means of a Gericke metering apparatus. The pump feeds a grinding chain comprising, in succession, a Brogli toothed mill, a Fryma core mill and a Fryma stone mill. The ground mixture of beans and water is heated for 30 seconds to 140° C. by the injection of steam and is then cooled by flashing. This gives an aqueous dispersion, containing 6.5% of dry matter, of soya particles ranging in size from approximately 100 to 400μ. This dispersion is ground in a laboratory bead mill, Dyno KDL of the Bachofen company, which operates continuously. This mill has a grinding chamber with a free volume of 0.6 in which four agitator discs 6.4 cm in diameter rotate at an adjustable peripheral speed. The grinding chamber is filled to a level of four fiths with grinding beads from 1 to 1.5 mm in diameter. The dispersion is ground at an initial pH of 7.1, at a rate of 2.5 l/h, at a temperature of from 25° to 28° C. and at a peripheral speed of the agitators of 15 m/s. The suspension obtained is interesting in regard to the fineness of the corpuscles, but has an unpleasant flavour, a slightly grey colour and a pH of 9.6.

EXAMPLE 2

The dispersion obtained in accordance with Example 1 is ground in a bead mill under the same conditions as described in Example 1, except for the fact that the pH of the dispersion is reduced to 5.1 with hydrochloric acid before the dispersion is introduced into the mill. A suspension is obtained of which most of the corpuscles have dimensions under 15μ and which has a neutral flavour, a white colour and a pH of 6.3.

EXAMPLE 3

Whole soya beans are crushed in an Excelsior mill equipped with toothed discs. The hulls are separated by means of a blower. 5 kg of crushed and hulled beans are soaked in 40 liters of water of which the temperature is kept at 95° C. for 30 minutes. The mixture of soaked beans and water at 95° C. is ground for 30 minutes in a Polytron dispersion mill. The ground mixture is heated for 30 seconds to 125° C. by the injection of steam. This gives an aqueous dispersion, containing 8.2% of dry matter, of soya particles of which the dimensions are of the order of 400 to 500μ. This dispersion is ground in a Dyno KDL bead mill, such as described in Example 1, at an initial pH of 6.9, at a rate of 2 l/h, with grinding beads from 1 to 1.5 mm in diameter displacing 480 ml of the total volume, at a temperature of from 25° to 28° C. and at a peripheral speed of the agitators of 10 m/s. A first suspension is obtained which has a pH of 7.7 and which, examined under a microscope, clearly reveals the origin of its constituent corpuscles, namely fragments of the cell content of cotyledons and cell wall debris. This first suspension is reintroduced into the bead mill under conditions identical with those of the initial grinding operation. A second suspension is obtained which has a pH of 9, a viscosity of 250 cP, an unpleasant aroma, a slightly grey colour and of which almost all the corpuscles have dimensions under 10μ. The pH of this second suspension is lowered to 7 by the addition of hydrochloric acid, the effect of which is to eliminate the unpleasant aroma and the grey tone of the colour. This suspension is perfectly colloidal and stable and readily lends itself to the preparation of chocolate dessert creams and custards.

EXAMPLE 4

American soya beans are crushed in a type BM Frewitt pinned crusher. The hulls are removed by means of an Aeromatic air-jet separator. By means of a Gericke metering apparatus, hulled beans are fed at a rate of 1 kg/minute for 6 kg/minute of water at 95° C. to a double-walled Archimedean screw in which a temperature of from 95° to 98° C. is maintained. The passage through the screw lasts 10 minutes. The mixture of water and beans coming from the screw is then ground in a Fitzmill blade mill equipped with a 1 mm mesh grid operating at speed 3 in which a temperature of 98° C. is maintained. The ground mixture is heated for 20 seconds to 140° C. and then cooled to 80° C. by flashing. This gives an aqueous dispersion, containing 13% of dry matter, of soya particles among which are discernible almost exclusively fragments of cells up to 200μ in size and pieces of tissue ranging from 300 to 600μ comprising whole solid cells.

This dispersion is ground in a Dyno KDL bead mill such as described in Example 1 at an initial pH of 6.6 and at an initial temperature of 20° C. with grinding beads from 1 to 1.5 mm in diameter filling three-quarters of the grinding chamber and at a peripheral speed of the agitators of 10 m/second. The throughput is regulated in such a way that the residence time in the apparatus, i.e. the duration of the treatment, is 2.4 minutes. An increase in temperature of 9° C. is observed during the treatment. The pH also increases by 0.5 unit. A suspension is obtained which shows no trace of sedimentation after 50 hours and which has a viscosity of from 80 to 90 cP. It contains corpuscles of proteins and fats from 2 to 3μ in size and cell wall debris not exceeding 40 to 70μ in size. It has neutral aroma and taste, a pleasant consistency and an attractive white colour.

EXAMPLE 5

An aqueous soya dispersion is prepared in the same way as described in Example 4. Sugar and crushed almonds are added to it in quantities of, respectively, 40% and 3% by weight, based on the dry matter of the soya. Bitter almond flavouring is also added (No. 101507, a product of V. Mane Fils). The whole is then ground in a bead mill in the manner described in Example 4. A cream is obtained.

EXAMPLE 6

An aqueous soya dispersion is prepared in the same way as described in Example 4. Cocoa and sugar are added to it in quantities of, respectively, 40% and 30% by weight, based on the dry matter of the soya. Gelatin is also added in a quantity of 0.5%, based on the volume of the dispersion. The whole is ground in a ball mill in the same way as described in Example 4. A chocolate jelly is obtained.

EXAMPLE 7-10

The same aqueous soya dispersion, obtained as described in Example 4, is subjected to different grinding operations in the Dyno KDL bead mill, but after dilution to a dry matter content of 6.5%. First the residence time in the mill is varied, and then the peripheral speed of the agitators. Otherwise, the conditions are the same as described in Example 1. The particular conditions of the various treatments and the calculable results obtained are set out in the following Table:

| Example No. | 7 | 8 | 9 | 10 |
|---|---|---|---|---|
| Conditions: | | | | |
| Peripheral speed of the agitators (m/s) | 10 | 10 | 10 | 6.7 |
| Residence time (mins.) | 2.4 | 3.6 | 7.2 | 2.4 |
| Results: | | | | |
| Maximum size of cell wall debris ($\mu$) | 40–60 | 20 | 10 | 40–60 |
| Increase in pH (units | 0.2 | 0.2 | 0.2 | 0.2 |
| Viscosity (cP) | 16 | 18 | 19 | 14.7 |
| Increase in temperature (°C.) | 5 | 5 | 4 | 4 |

None of the suspensions obtained shows the least trace of sedimentation after standing for 50 hours. They all contain corpuscles of proteins and fats of which the dimensions are of the order of 2 to 3$\mu$ and the variations in the degree of grinding only influence the maximum dimensions which the cell debris may still have. All four suspensions have a neutral aroma and taste, a pleasant consistency and an attractive white colour, but a panel of experienced tasters awarded first place to the suspension of Example 10. By way of verification, this suspension is subjected to an examination to determine its content of trypsin inhibitor. It is found that this content amounts to 110 units per mg of nitrogen, i.e. one-eighth of the normal content of soya. This shows that the trypsin inhibitor was reduced to such a level during the present process that the product obtained eminently lends itself to human consumption.

EXAMPLES 11-16

An aqueous soya dispersion is prepared in the same way as described in Example 4, except that the degree of dilution is approximately two times greater. There is obtained an aqueous dispersion, containing 6.9% of dry matter, of soya particles of which the largest do not exceed 500 to 600$\mu$ in size. The dispersion obtained has a viscosity of 84 cP and a pH of 6.6. This dispersion, of which approximately 40% of the dry matter sediments rapidly, is subjected to various grinding tests in a Netzsch LM 20 semi-industrial bead mill which has a grinding chamber with a free volume of 19 liters in which rotate cooled agitators with 3 radial discs 17 cm in diameter and 4 discs 16 cm in diameter arranged obliquely and in alternation with the former. The tests are carried out with different throughputs and different concentrations, adopting or maintaining identical conditions, namely an initial pH of 6.6, an initial temperature of 15° to 17° C., a peripheral speed of the agitators of 10 m/s and with beads 1 to 1.5 mm in diameter which fill four-fifths of the grinding chamber. The particular conditions of the various tests and the results obtained are set out in the following Table:

| Example No. | 11 | 12 | 13 | 14 | 15 | 16 |
|---|---|---|---|---|---|---|
| Conditions: | | | | | | |
| Throughput (l/h) | 100 | 140 | 180 | 100 | 140 | 250 |
| Concentration (%) | 7 | 7 | 7 | 10 | 10 | 10 |
| Results: | | | | | | |
| Maximum size of the cell debris ($\mu$) | 100 | 200 | 200–300 | 200 | 200–300 | 200–400 |
| Viscosity (cP) | 17–18 | 15 | 14 | 65 | 55 | 54–57 |
| Sedimentation (estimation) | nil over 3 days | very little over 3 days | | | hardly any, suspension very thick | |

The pH of all the suspensions obtained increases at most to pH 6.8. The dimensions of the corpuscles of proteins and fats of the suspensions of Examples 11 and 16 barely exceed 10$\mu$.

EXAMPLE 17

An aqueous soya suspension is prepared in the same way as described in Example 12. The suspension thus prepared is poured into 5-liter Erlenmeyer flasks in quantities of 2 liters per flask. This is followed by sterilisation by heating for 8 minutes at 115° C. After cooling, each flask is inoculated by the introduction of 200 ml of a suspension of the microorganism *Streptococcus thermophilus*. After incubation for 6 hours at 40° C., a completely coagulated product is obtained which is cut up and filtered. A curd in the form of fragments containing 20% of dry matter, of which 40% is protein, is obtained. This curd has organoleptic properties very similar to those of a lactic curd.

EXAMPLE 18

A soya curd is prepared in the same way as described in Example 17. Sunflower oil is then added to it in a quantity of 30% by weight, based on the dry matter content of the curd. 0.5% of vegetable protein hydrolysate, 9% of NaCl and 0.2 o/oo of onion extract are also added, the % and the o/oo being calculated in weight of the dry matter content of the initial curd. Homogenisation gives a paste for spreading which has a pleasant appearance, odour and taste.

EXAMPLE 19

An aqueous soya suspension is prepared in the same way as described in Example 4. The volume of the suspension is reduced to two-fifths of its initial volume by ultrafiltration at 20° C. under a pressure on entry of 5 kg/cm² and a pressure on exit of 3 kg/cm². Ultrafiltration is then continued under the same conditions, but keeping the volume of the retentate constant by the addition of water, i.e. the retentate is washed until 70% of the sugars of the soya have flowed away with the permeate. A whole cows' milk is ultrafiltered. The soya retentate is mixed with the cows' milk permeate in a proportion of 9 parts of dry matter of the retentate to 5 parts of dry matter of the permeate in question. The mixture is concentrated by evaporation in vacuo. It is then sterilised by the injection of steam at 105° C. for 2 minutes, followed by spray drying. A powder is obtained which, after reconstitution by the addition of water, gives a semi-skimmed cows' milk substitute of excellent quality.

We claim:

1. A process for the production of an aqueous soya suspension, which comprises grinding soya beans in the presence of water at a temperature of from 90° to 100° C. to form a dispersion of particles of which the majority have dimensions of about 100 to 500μ; heating the dispersion by the injection of steam to a temperature of from 120° to 160° C. thereby destroying antitrypsin factor in the soya beans; and grinding the dispersion to form a suspension containing corpuscles of protein and fat with dimensions of about 2 to 10μ and cell wall debris of which the largest dimension does not exceed about 40 to 300μ.

2. A process as claimed in claim 1, wherein the largest dimension of the cell wall debris does not exceed about 40 to 100μ.

3. A process as claimed in claim 1, wherein the dispersion is grinded in a bead mill.

4. A process as claimed in claim 1, wherein, prior to grinding the soya beans in the presence of water, the beans are crushed and hulled in dry form, and then blanched for 5 to 15 minutes in water of which the temperature is kept between 90° and 100° C. in proportions of 6 to 10 parts by weight of water to 1 part by weight of beans.

5. A process as claimed in claim 1, wherein, for grinding in the presence of water, the beans are mixed with water in a ratio by weight of from 1:2 to 1:8.

6. A process as claimed in claim 1, wherein the dispersion is heated by the injection of steam for 5 to 30 seconds.

7. A process as claimed in claim 1, wherein the dispersion is cooled to a temperature of 75° to 85° C. by flashing after the injection of steam.

8. A process as claimed in claim 1, wherein a suspension is obtained having a viscosity between 10 and 100 cP at 20° C. when the dry matter content of the suspension is from 6 to 13% by weight.

9. A process as claimed in claim 1, wherein a suspension is obtained having a pH between 6.6 and 7.

10. A process as claimed in claim 1, wherein the suspension obtained is subjected to ultrafiltration or diafiltration.

11. A process as claimed in claim 1, wherein the suspension obtained is subjected to a lactic fermentation.

12. A cows' milk substitute comprising an aqueous soya suspension obtained by the process of claim 1 and an ultrafiltration permeate of a cows' milk or whey.

* * * * *